N. F. YAGN.
Apparatus for Measuring Height.
No. 197,444. Patented Nov. 20, 1877.
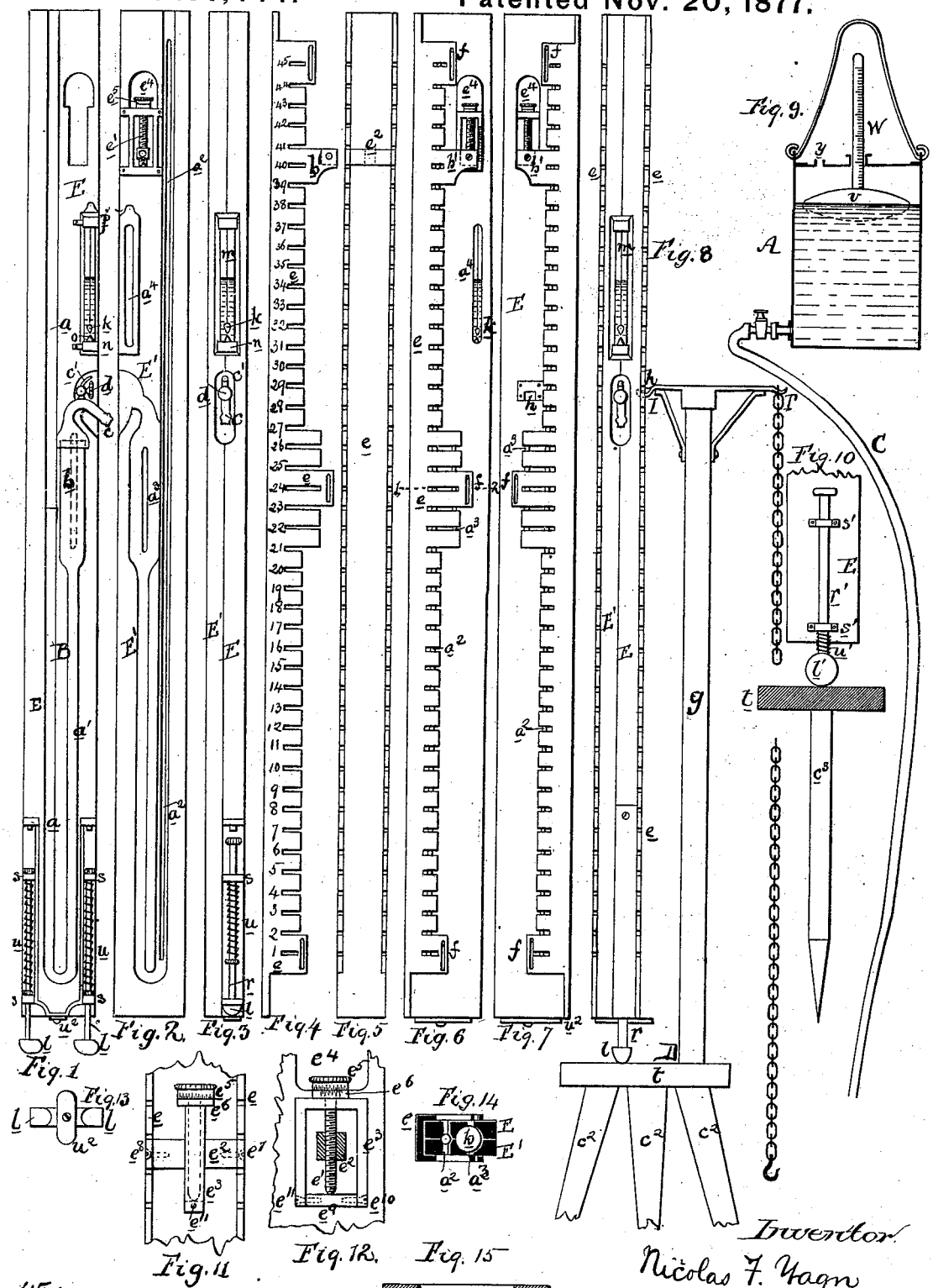

UNITED STATES PATENT OFFICE.

NICOLAS F. YAGN, OF MOSCOW, RUSSIA, ASSIGNOR OF ONE-HALF HIS RIGHT TO LEWIS I. SURVILLO, OF SAME PLACE.

IMPROVEMENT IN APPARATUS FOR MEASURING HEIGHTS.

Specification forming part of Letters Patent No. 197,444, dated November 20, 1877; application filed June 16, 1877.

*To all whom it may concern:*

Be it known that I, NICOLAS F. YAGN, of Moscow, in the Empire of Russia, have invented a new and useful Improvement in the Method of Measuring Heights by means of a new instrument, called "Manometrical Altimeter," of which the following is a specification:

The object of my invention is the application of hydrostatic pressure to leveling, and the construction of an apparatus, called "manometrical altimeter," destined for ascertaining the relative height of objects or of certain points in localities in cases where direct measuring is difficult or even impossible.

Compared with the apparatus already in use for the same purpose, my manometrical altimeter offers, among others, the advantage of considerably simplifying the solution of problems in leveling, and of being adaptable even to such cases where the other apparatus are found of no use.

The construction and action of the manometrical altimeter are based on the well-known hydrostatic law according to which the pressure produced by a column of liquid upon the sides of a vessel depends neither on the form nor the dimensions of the vessel, but merely on the height of the column and the density of the liquid itself.

Taking any reservoir A, and connecting the same, by a flexible tube, C, with any pressure-gage, as, for instance, an open mercury manometer, B, and the flexible tube C and reservoir A being filled with any liquid whatever—water, for instance—the indications of the manometer B will, according to the aforementioned law, only show the relative height where the reservoir is placed. The diameter of the flexible tube C, its length and shape, the nature of its sides, as well as the greater or lesser height of placing the intermediate parts of the tube, will have no influence whatever upon the indications of the manometer.

By this fact it becomes evident that when the mercury manometer B is in a fixed and stable position, its indications will only change in case of the reservoir A, with the liquid, being moved in vertical direction, and the changes will strictly correspond to the vertical motion of the reservoir A. Admitting the reservoir A be placed at a certain height, H, the indication of the manometer B will be $=h$. If we move the reservoir A to H′, the indication of the manometer will change from $h$ to $h + a$, giving the following proportion:

$$H : (H + H') = h : (h + a,) \text{ hence } H' = \frac{H}{h} \times a.$$

Here $\frac{H}{h}$ is a constant quantity, and is fixed, by experience, once for all, for every apparatus. Consequently, for ascertaining the quantity H′, we want only to ascertain the quantity $a$. This quantity is the difference between two consecutive indications of the manometer B, which are obtained by simple counting on the scale of the manometer. On this very combination are based the construction and action of my manometrical altimeter.

The flexible tube C and reservoir A may be filled, instead of water, with alcohol or any other convenient liquid.

The manometrical altimeter, the construction whereof is shown in the drawings hereto annexed, consists of three main parts—viz., the manometer, the reservoir, and the flexible tube connecting the same.

Figure 1 represents the front view of an open mercury manometer, B, set into or otherwise fixed to the small wooden board E. Fig. 2 is view of the hind or interior surface of another board, E′, destined to be put on the first, and to serve for preserving the manometer from being damaged. Fig. 3 is a side view of the boards of the apparatus put together, and containing the manometer B; Fig. 4, a front view, and Fig. 5 a side view, of a moving comb-like scale for counting the indications of the manometer, as hereinafter particularly described; Fig. 6 and 7, the front and back views of the complete manometrical apparatus, provided with the comb-like scale and other appurtenances; Fig. 8, a side view of the apparatus hanging on the support; Fig. 9, a vertical section of the reservoir A, provided with the flexible tube C; Fig. 10 shows one of the modes proposed for keeping the apparatus in a vertical position; Figs. 11 and 12, the front and side views of a micrometrical screw, serving for accurately counting the indications of the manometer B; Fig. 13, a view from below of the board E; Fig. 14, a transverse section of the apparatus along the line 1 2 in Fig. 6.

As may be seen in the drawings, the manometer B itself consists of the bent glass tube $a\,a^1$, of which one end, $a$, is open, and the other, $a^1$, being considerably shorter, is widened out in the shape of a small cup, $b$, placed at about half the height of the knee $a$.

The diameter of the cup $b$ is made about four times as large as the inside of the tube, and its capacity a little more than that of the whole canal of the tube.

The cup $b$ may be of iron or of glass, with a metallic rim or lid on top, as shown in Fig. 1. From the lid of the cup $b$ passes a crooked pipe, $c$, at the upper bent of which is the branch $c^1$, provided with the air-tap $d$, and to the end of the pipe $c$ is fixed the free end of the flexible tube C, Fig. 9.

For leveling not requiring particular accuracy, may be employed a mercury manometer without the cup $b$; but in order to diminish the chances for errors, it is required in such case to determine the position of mercury in both knees, while in using the manometer with the cup it is determined only in the knee $a$.

The boards E E', placed together conveniently, and fixed to each other by screws or some other way, form a case to the manometer, which is placed in the metallic comb-like scale $e$, Figs. 4 and 5.

The scale $e$ can be moved up and down by means of the micrometrical screw $e^1$. For this purpose, after placing the wooden case with the manometer, there is fixed on the top part of the scale $e$, by means of the screws $e^7$ and $e^8$, the cross-piece $e^2$, with a nut-screw, Figs. 5, 11, and 12, through which passes the screw $e^1$, turning in a fixed frame, $e^3$, incased in the corresponding cavity $e^4$ of the board E', Fig. 2. The screw $e^1$, when turning, presses against the metallic plate $e^9$, which is kept in its place by the screws $e^{10}$ and $e^{11}$, Figs. 11 and 12.

The pitch of the screw $e^1$ is equal to one millimeter. The circumference of the head $e^5$ of the screws is divided into fifty equal parts, and resting on the fixed disk $e^6$, provided with a vernier or nonius.

The motion of the scale $e$ is guided by the pegs $f$, which are fixed to the board E E' and pass through corresponding spaces of the scale $e$, Figs. 6 and 7.

The three guiding-pegs $f$ may be reduced to two (upper and lower) or even one, below, since the screw $e^1$ itself, passing through the cross-piece $e^2$, may serve as a guide above. Besides, it is evident that the fixed disk $e^6$, with the vernier and the micrometrical screw $e^1$, duly fixed to the moving scale $e$, with its frame and constant scale, can be placed on top of the apparatus or in any other convenient place—as, for instance, near the bottom.

The moving scale $e$ may also, without departing from my invention, be made in the form of a case surrounding the boards E E' on all sides, Fig. 15, the cuttings 1 2 3, &c., being wide enough to cover the clefts $a^2$ and $a^3$.

By this construction the motion of the comb-like scale $e$, and consequently the indications of the manometer B, can be exactly noted up to $\frac{1}{500}$ millimeter.

For observing the level of mercury in the knees of the tube $a\,a^1$ there are clefts or rifts $a^2\,a^3$ cut through both wooden boards E E', Figs. 2 and 14, about three millimeters wide, the first of which is about as long as the whole length of the tube $a$, and the second equal to the size of the cup $b$ at the end $a^2$.

It is evident that, when a mercury manometer without the cup $b$ is used, the length of the knee $a'$ is made equal to the length of the knee $a$, and the length of the cleft $a^3$ equal to the length of the cleft $a^4$.

These clefts are shut outside by the comb-like scale $e$, so as to shine through the spaces of the comb, as shown in Figs. 6 and 7. It is evident that, looking through these spaces, the light will pass only through those parts of the clefts $a^2\,a^3$ that correspond with the parts of the tube $a$ and cup $b$ not occupied by mercury.

The comb-like scale $e$ is cut out in such manner as to place the upper edges of the spaces at an exact distance of a certain number of centimeters from each other. Besides, on one of the longitudinal ribs of the frame $e^3$, Figs. 6 and 12 of the micrometrical screw $e^1$, divisions of one millimeter are marked at a length a little more than the distance between two contiguous spaces of the comb $e$. Along these divisions the prominence $b^1$, Figs. 4 and 6, of the scale $e$, moves in such manner that the position of the scale $e$ can always be exactly determined by means of the line $b^2$ marked on this prominence. The spaces of the comb-like scale, for more convenience, are numbered 1 2 3 4. As it is not required, for leveling according to my method, to know the absolute height of the mercury column, and merely wanted to know the changing thereof—i. e., the difference between two succeeding indications—it needs no particular accuracy in placing the comb relating to the wooden boards of the apparatus, and only requires that the distance between the upper edges of the spaces should be strictly invariable.

The counting of the manometer's indications, by means of the comb-like scale $e$, is performed as follows: Looking toward the light through the teeth of the comb, we remark at once the light shining through the first space above the mercury in the part $a$ of the tube. Let us say it be the eleventh space from below. Raising the scale $e$, by means of the micrometrical screw $e^1$, and observing the tenth space, which as yet lets no light pass, we remark the moment when the first ray of light is passing through the same. At this moment the turning of the screw $e^1$ is stopped, because the appearance of light proves that the upper edge of the space 10 is level with the surface of the mercury in the knee $a$ of the manometer B. Observing on the divisions of the frame $e^3$ the number of millimeters the scale $e$ was raised, and on the vernier the part of turn given to the head $e^5$, the height of mercury in the knee $a$ of the tube is exactly ascertained. If, for instance, the distance between the upper edges of the spaces is two centimeters, and the tenth space had to be raised three millimeters, and, besides, the screw-head $e^5$ wanted turning for 25.3 divisions, the height of the mercury is $203\frac{253}{500}$ millimeters or 203.506 millimeters.

For leveling not wanting minute exactness, the indications of the manometer may be counted by means of an ordinary scale provided with a vernier and other requisites generally used. In this case, however, the manometer B is fastened to the scale immovably.

The manometrical apparatus is suspended by the eye $h$, Figs. 7 and 8, at the hook $i$ of the stay $g$ of the support D. Although the manometer thus suspended will strive to take a vertical position, this position will not be strictly determined nor sufficiently stable, because the slightest draft of air or contact will shake the manometer. For removing this inconvenience, I propose the application of the plummet $k$ and the friction-shoes $l\ l$, Figs. 1, 3, and 8. The plummet $k$ is placed in the glass tube $m$. The metallic bottom $n$ of this tube has in the center a conic point, $o$. The line of the plummet $k$ is fastened in the center of the metallic lid $p$, covering the tube $m$, of which about one-half is filled with alcohol, transparent oil, or some other convenient liquid. The plummet $k$, being in the liquid, will settle incomparably sooner than without the same. For observing the position of the plummet $k$ the board E' is provided with the cleft $a^4$. Sidewise the plummet is perfectly visible. The tube $m$, with the plummet $k$, can, of course, be fastened at any place that may be thought convenient outside of the case E E'.

The friction-shoes $l\ l$ are fixed to the ends of the rods $r\ r$, and provided with a somewhat convex basis. The rods $r$ pass through the guiding-eyes $s$, and are surrounded by the springs $u$, pressing the shoes $l$ against the platform $t$ of the support D, Fig. 8. To preserve the rods $r$ from breaking or being damaged when the apparatus is moved, &c., a turning-bar, $u^2$, Figs. 1, 8, and 13, is applied to the lower end of the wooden board E, keeping, if desired, the shoes $l\ l$ inside of the board E, Figs. 3, 6, and 7.

Instead of the shoes $l\ l$, a friction-weight, $l'$, may be placed at the hind part of the board E, as shown in Fig. 10. The rod $r'$ of this weight moves in the same manner as in the foregoing case, viz., in the guiding-eyes $s'$. The weight $l'$ is also pressed, like the shoes $l$, against the platform $t$ by the spring $u^1$.

The application of the shoes and that of the friction-weight comparatively secures a stable vertical position of the manometer apparatus, even when the position of the support D is more or less inclined. Combined with the plummet, these contrivances permit bringing the manometer easily and speedily into a vertical position, or, in case of the axes of the manometer and plummet-tubes not being parallel, into a position of a constant incline.

Fig. 9 represents the liquid-reservoir A, either of metal or glass. In the latter case it must be placed in a metallic case with a vertical aperture, to observe the level of the liquid.

When the reservoir is made of metal, as shown in the drawing, there may be placed in it a float, $v$, from which, through a hole in the lid of the reservoir, passes the rod $w$, with a scale-division for ascertaining the level of liquid in the reservoir A, or this reservoir may be provided with a water-gage.

The lower part of the reservoir A is provided with the pipe $x$ and top $x'$, whereon is fixed one end of the flexible tube C, and in the lid of the reservoir is an aperture, $y$, for air.

For ordinary purposes the capacity of the reservoir is about one liter.

The flexible tube C may be of common india-rubber, with linen lining of about two and a half to three and a half millimeters in diameter. At a length of one hundred meters such hose weighs about three kilograms.

The manometer B is filled with mercury to about one-half. The remaining part of the cup $b$, the canals of the tubes $c$ and C, and the greater part of the reservoir A, are filled with the acting liquid—$e.\ g.$, water.

The filling of the apparatus with the acting liquid is very easily done. For this purpose it is only required to place the filled reservoir A above the manometer B and open the tap $d$. The water will gradually drive the air out and fill the canals. The tap $d$ must be shut some time after water is seen coming out.

The measuring of height by the manometrical altimeter is done as follows: Let us imagine we want to ascertain the vertical distance between two points, 0 and 0', in any locality whatever, the distance between these points by far exceeding the length of the india-rubber tube; further, let us admit the leveling to be proceeding from 0 toward 0', and let us imagine along the distance between 0 and 0' a certain number of points, 1 2 3 4 5, &c., distributed in such manner that the distance between two points following each other be not greater than the length of the india-rubber tube of the apparatus. First of all, the liquid-reservoir is placed at the point 0, and the support with the manometer taken to the point 1. The manometer being brought into a vertical position, we note its indication. Let us presume that this indication will be expressed by $a$. This done, the support, with the manometer, is left at point 1, the liquid-reservoir placed at point 2, and the indication of the manometer noted again—say, it indicates $a_1$; then the difference between the indications $a - a_1 = d$ expresses the respective height of the points 0 and 2. Further, leaving the liquid-reservoir at 2, the support, with the manometer, is removed to the point 3, whereby we get, for instance, the indication $a_2$. Removing hereafter the liquid-reservoir to 4, and leaving the support, with the manometer, at 3, we obtain the manometer-indication $a_3$. The difference of these two indications $a_2 - a_3 = d_1$ is the expression of the difference of height between the points 2 and 4. The algebraic sum of the two differences, $d + d_1$, however, shows the respective height of the points 4 and 0. Proceeding in the same manner, we at last reach the point $0'$, obtaining a series of differences, $d\ d_1\ d_2\ \ldots\ d_n$, the algebraic sum whereof determines the relative elevation H of the point 0 above the point $0'$—i. e., $H = (d + d_1 + d_2 + \ldots\ldots d_n)k$.

The quantity $k$ represents the relation of the indications of the manometer to the vertical motion of the liquid-reservoir. This quantity changes when a change of temperature takes place, which, as is well known, acts upon the density of liquids. Therefore it is useful to verify from time to time the coefficient $k$.

For this purpose the stay $g$ of the support D is provided with a second hook, $i'$, Fig. 8, holding the chain $z$ of a determined length. Suspending the liquid-reservoir A successively, first by the hook $i'$ and then by the hook $z'$ at the lower end of the chain $z$, and noting the corresponding changes in the indications of the manometer, we obtain the ratio $\frac{h}{h'}$, being the expression of the quantity $k$.

For suspending the reservoir A by the hooks $i'$ and $z'$ it is provided with the handle $x^2$, Fig. 9.

Instead of the chain $z$ two small horizontal platforms may be fixed for the same purpose to one of the boards E E' (at the upper and lower ends) at a determined distance from each other, and the reservoir placed alternately on the one and the other of these platforms. A separate stay, provided with hooks for suspending or platforms for placing the reservoir A, may be used likewise. In the latter case the verification of the manometer-indications may be performed at any distance from the same within reach of the flexible hose C.

It is easily understood that such verification is only required when a change of conditions is presumed. The verification itself may be made, by the way, while moving the reservoir from place to place and passing by the manometer.

The three legs $c^2$ of the support D may be replaced by one stake, $c^3$, Fig. 10, pointed at the lower end, by means of which the support is stuck into the ground or, where the soil is rocky, into a cruciform foot specially provided.

Experience has taught that, no matter whether the manometer is undergoing a positive or negative pressure—i. e., whether the reservoir with the liquid is placed above or below the manometer—the sensitivity of the described manometrical altimeter is sufficiently strong.

Work with the manometrical altimeter, even with only one man for assistance, who only needs to know how to carry the liquid-reservoir from place to place, and at the same time take up the india-rubber tube, is carried on very speedily, and with a mercury manometer one meter high one may measure at a time up to thirteen meters elevation, which cannot be attained by employment of the ordinary leveling-instruments.

In measuring steep declivities, especially in case no particular accuracy be required, manometers of other systems may be employed, as aforementioned, affording the possibility of measuring up to sixty meters elevation at a time.

It is evident that the manometrical altimeter, by its accuracy, small weight, and simplicity of action, can with advantage compensate the optic leveling-instrument generally used, especially in cases where the locality is hilly and covered with wood. In the latter case this apparatus requires neither clearing of wood nor the selection of visible points.

In architectural works the manometrical altimeter is useful for ascertaining the regular laying of walls, foundations, floors, ceilings, for establishing stair-cases, for ascertaining the settling of walls, &c. In all these cases the manometer can remain in one place, and only the liquid-reservoir wants moving. No matter whether the india-rubber tube passes over walls, up or down, from one story to another, we will always obtain very exact indications.

The manometrical altimeter may likewise be of great utility for the regulation of water-pipes, digging of canals and drainings, building bridges, erection of machinery, adjusting of shafts—in one word, wherever the determination of height is required.

I claim as my invention—

1. The combination of the manometer B and casing-boards E with the adjustable scale $e$, provided with slits or cuttings, as set forth.

2. The combination of the support D and its platform with the measuring-gage B and the spring-shoes $l$, as specified.

3. The combination of the manometer B and scale $e$ with the micrometrical screw $e^1$ and the casing or boards E.

4. The combination of the manometer B with the plummet $k$, support D, and chain 2, as and for the purpose set forth.

5. The combination of the tube $m$, containing liquid, with the plummet $k$.

In testimony whereof I have signed my name to this specification in the presence of two subscribing witnesses.

NICOLAS F. YAGN.

Witnesses:
NICOLAS KARTSOFF,
NICOLAS PROTOPOPOFF.